(12) United States Patent
Nakamori et al.

(10) Patent No.: US 7,539,117 B2
(45) Date of Patent: May 26, 2009

(54) OPTICAL PICKUP

(75) Inventors: Tatsuya Nakamori, Okayama (JP); Masayuki Ono, Osaka (JP); Naoki Nakanishi, Shiga (JP); Masahiko Nishimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 524 days.

(21) Appl. No.: 11/498,989

(22) Filed: Aug. 4, 2006

(65) Prior Publication Data

US 2007/0030788 A1    Feb. 8, 2007

(30) Foreign Application Priority Data

Aug. 5, 2005    (JP)    ............................. 2005-228232

(51) Int. Cl.
*G11B 7/00*    (2006.01)
(52) U.S. Cl. .............................. 369/112.06; 369/112.07
(58) Field of Classification Search ............ 369/112.07, 369/112.06, 112.05, 112.12, 112.18, 112.1, 369/112.11
See application file for complete search history.

(56) References Cited

U.S. PATENT DOCUMENTS 6,724,699 B2 *   4/2004   Shibuya ................... 369/44.37
2005/0078575 A1 *   4/2005   Shibuya et al. ........... 369/44.37

FOREIGN PATENT DOCUMENTS

| JP | 4-34212 | 2/1992 |
|----|---------|--------|
| JP | 10-162383 | 6/1998 |
| JP | 2001-325738 | 11/2001 |

* cited by examiner

*Primary Examiner*—Wayne R Young
*Assistant Examiner*—LaTanya Bibbins
(74) *Attorney, Agent, or Firm*—McDermott Will & Emery LLP

(57) ABSTRACT

An optical pickup has a semiconductor laser, a diffractive optical element that has first diffraction regions and second diffraction regions and diffracts a beam emitted by the semiconductor laser, an objective lens that focuses the diffracted beam on an optical disc, and a detection unit that detects a tracking error signal using the diffracted beam reflected by the optical disc. When a zero order diffraction beam is focused on the optical disc, a first order diffraction beam is diffracted by the first diffraction regions to be focused at a position between the objective lens and the optical disc, and diffracted by the second diffraction regions to be focused at a position beyond the optical disc. The first order diffraction beam has a beam width that, on the optical disc in a radial direction thereof, is two times or greater a track pitch of the optical disc.

5 Claims, 17 Drawing Sheets

FIG.5A  MPP
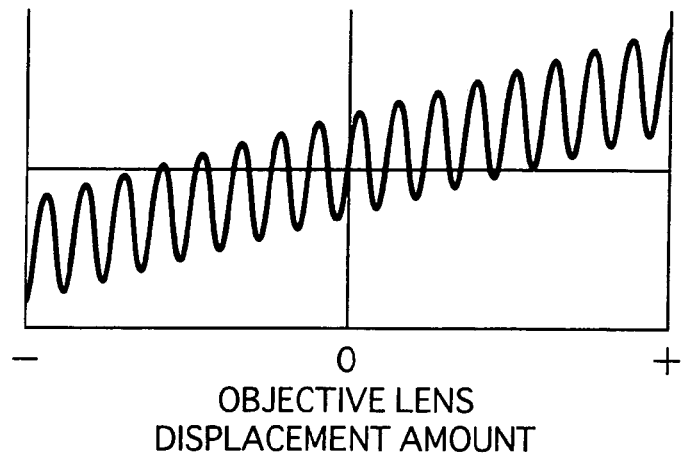
FIG.5B  SPP1, SPP2
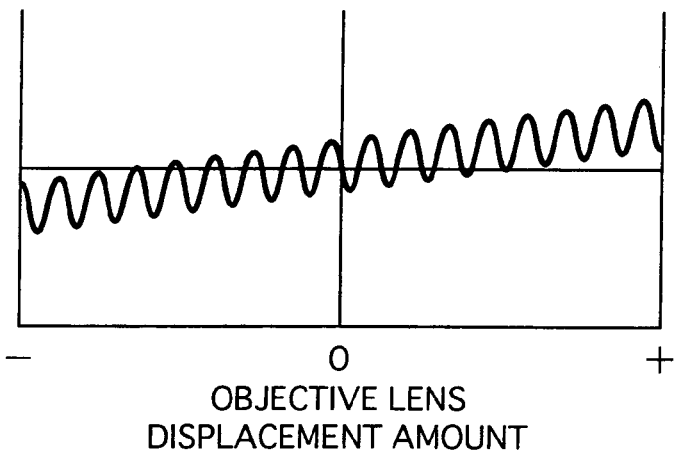
FIG.5C  DPP=MPP−k×(SPP1+SPP2)
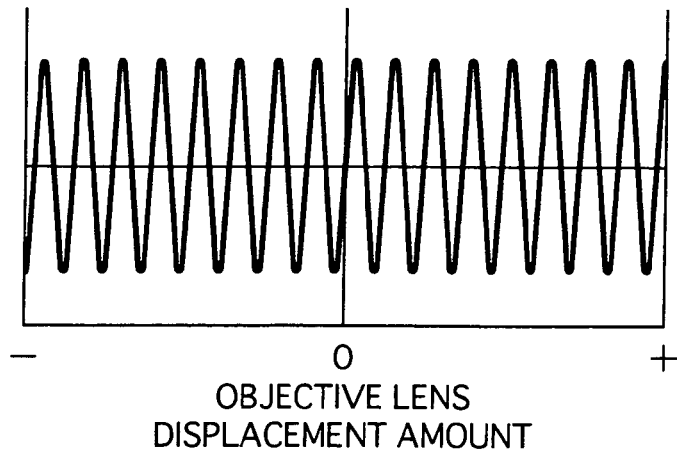

FIG.8
802
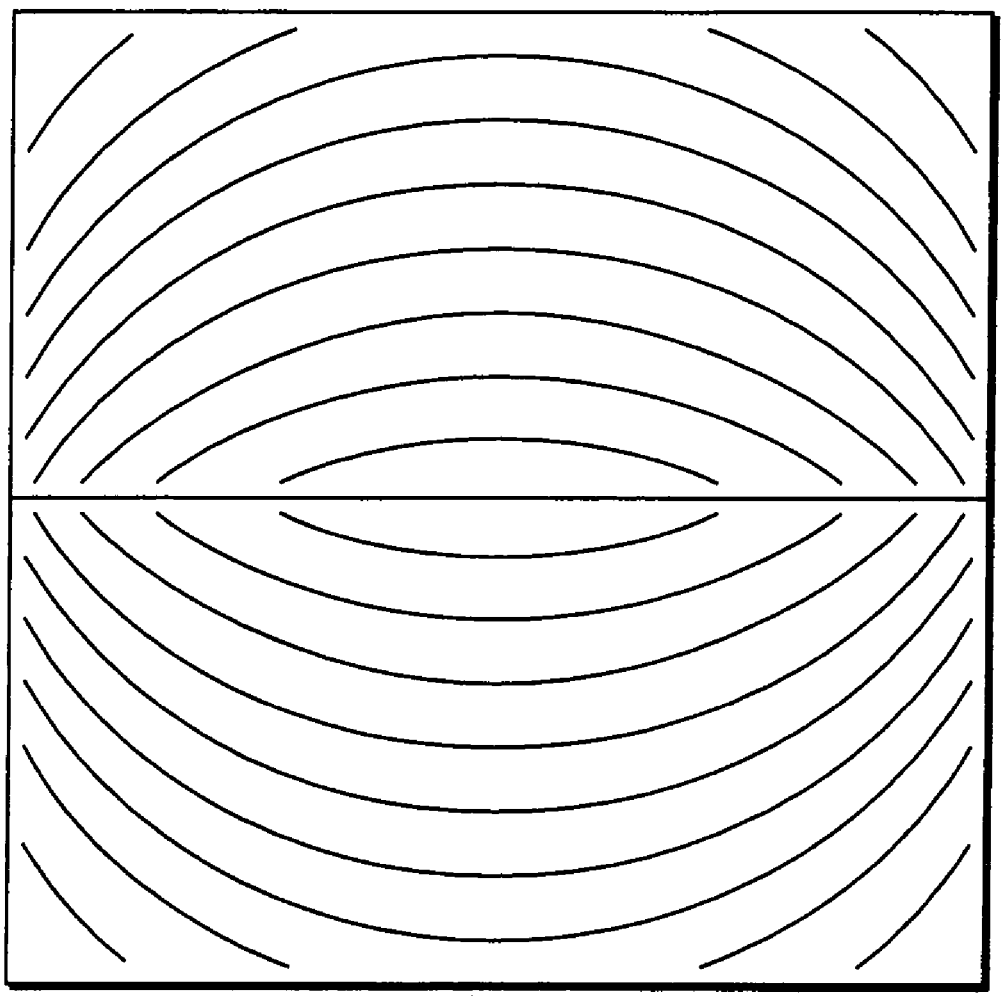
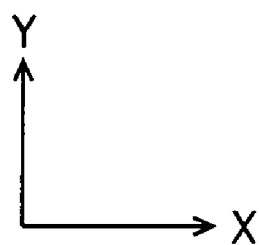

OBJECTIVE LENS
DISPLACEMENT AMOUNT

OBJECTIVE LENS
DISPLACEMENT AMOUNT

OBJECTIVE LENS
DISPLACEMENT AMOUNT

OPTICAL PICKUP

CROSS-REFERENCE TO RELATED APPLICATIONS

This application is based on application No. 2005-228232 filed in Japan, the content of which is hereby incorporated by reference.

BACKGROUND OF THE INVENTION (1) Field of the Invention

The present invention relates to an optical pickup, and in particular to a technique for performing tracking which high accuracy regardless of the standard to which an optical disc conforms.

(2) Description of the Related Art

When recording information to or playing back information from an optical disc, an optical beam must track a track on the optical disc accurately. To this end, it is necessary to detect a tracking error signal that is an indicator of displacement of the optical beam from the track.

CONVENTIONAL EXAMPLE 1

Japanese Patent Application Publication No. H4-34212 discloses a DPP (differential push-pull) method that is one way of detecting a tracking error signal.

FIG. 1 shows the principal structure of an optical pickup 1 of the conventional example 1. As shown in FIG. 1, the outgoing beam of a semiconductor laser 101 is split into three beams by a diffractive optical element 102, collimated into parallel beams by a collimator lens 102, and after passing through a beam splitter 104, is focused on an optical disc 111 by an objective lens 105. Light reflected by the optical disc 111 passes through the beam splitter 104 and a collective lens 106, to be conducted into an optical detector 107.

FIG. 2 shows beam spots that the optical pickup 1 forms on the optical disc 111. In FIG. 2, an X direction is a radial direction of the optical disc 111 (hereinafter, the radial direction of the optical disc 111 is referred to simply as the radial direction), and a Y direction is a direction parallel with a track of the optical disc 111. As shown in FIG. 2, an optical beam split into three by the diffractive optical element 102 forms a beam spot 201 of a zero order diffraction beam (main beam), a beam spot 202 of a plus first order diffraction beam (sub beam), and a beam spot 203 of a minus first order diffraction beam on the optical disc 111. The sub beams 202 and 203 are each positioned a distance that is half a track pitch T in the radial direction (a distance T/2) from the main beam 201.

FIG. 3 shows the structure of an optical detector 107. As shown in FIG. 3, the optical detector 107 has split optical detectors 301 to 303 that receive far field patterns of the optical beams 201 to 203, respectively. Each of the split optical detectors 301 to 303 is composed of a pair of optical detectors that receive respective ones of the two split beams that result from splitting the beam spot on the optical disc with a parallel line in the track direction.

Push pull signals MPP, SPP1 and SPP2 are obtained as difference signals of the output signals of the split optical detectors 301 to 303. If the beam spot of the main beam 201 is in the center of a track on the optical disc, each optical detector receives an approximately equal amount of light as its pair. However, if the beam spot of the main beam 201 deviates from the center of the track, each optical detector receives a considerably different amount of light to its pair.

FIG. 4 shows the relationship between the position of the objective lens 105 and the far field pattern received by the split optical detector 301. As shown in FIG. 4, when the objective lens 105 shifts in the radial direction, the far field pattern on the split optical detector 301 also shifts in the radial direction. This causes an offset in the tracking error signal.

FIGS. 5A to 5C are graphs showing the relationship between the displacement amount of the objective lens 105 in the radial direction, and the push pull signals MPP, SPP1 and SPP2. As shown in FIG. 5A, when the objective lens shifts in the radial direction, an offset signal corresponding to the amount of shift occurs in the push pull signal MPP. As shown in FIG. 5B, an offset signal corresponding to the amount of shift also occurs in each of the push pull signals SPP1 and SPP2.

Given that the main beam 201 and the sub beams 202 and 203 are irradiated a distance T/2 apart from each other in the radial direction, the phase of the push pull signal MPP is opposite to that of the push pull signals SPP1 and SPP2.

Using these push pull signals MPP, SPP1 and SPP2, differential error amplifiers 311 to 314 and an amplifier 315 of the optical detector 107 generate a tracking error signal. Specifically, $DPP=MPP-k(SPP1+SPP2)$    (expression 1).

This cancels the offset signals generated in the push pull signals due to shifting of the objective lens 105, and thus obtains a tracking error signal.

Note that k is a coefficient for correcting a difference in light intensity between the main beam 201 and the sub beams 202 and 203. Therefore, if the light intensity is zero order diffraction beam:plus first order diffraction beam:minus first order diffraction beam=a:b:b, $k=a/(2b)$.

With the wide variety of optical disc standards in recent years, it is necessary for a single optical pickup to be adaptable to various optical disc track pitches. However, with the method of the conventional example 1, the main beam and the sub beams must be irradiated on the optical disc at a distance T/2 apart in the radial direction, and therefore, with this method, a single optical pickup cannot adapt to a plurality of standards.

CONVENTIONAL EXAMPLE 2

Japanese Patent Application Publication No. H10-162383 discloses a technique that allows more freedom in terms of the irradiation positions of the main beam and the sub beams.

FIGS. 6A and 6B show a diffractive optical element 602 relating to the Conventional Example 2. FIG. 6A is a planar view of the diffractive optical element 602, and FIG. 6B is a cross-sectional view showing paths of light from the diffractive optical element to an optical disc.

As shown in FIG. 6A, a diffractive optical element 602 has a groove part 602a in the central part of an effective luminous flux of the optical beam, and a flat part 602b surrounding the periphery of the groove part 602a.

In the Conventional Example 1, the whole of the effective luminous flux of the optical beam is diffracted by the diffractive optical element, but in the Conventional Example 2, only part of the effective luminous flux is diffracted. For this reason, as shown in FIG. 6B, the beam diameter of sub beams 622 and 623 irradiated from the diffractive optical element 602 is smaller than the effective luminous flux diameter (the aperture diameter of an objective lens 605). This is equivalent to the numerical aperture of the objective lens 605 being reduced with respect to the sub beams 622 and 623.

On the other hand, the beam diameter of the main beam 621 of the diffractive optical element 602 is greater than the aperture diameter of the objective lens 605, and therefore a diffraction limited beam spot that corresponds to the aperture diameter of the objective lens 605 is formed on an optical disc 611.

FIG. 7 shows the beam spots that the main beam 621 and the sub beams 622 and 623 form on the optical disc 611. As shown in FIG. 7, the beam spot diameter of the main beam 621 is approximately the same as the main beam spot diameter in the Conventional Example 1, but the beam spot diameter of each of the sub beams 622 and 623 is relatively large, and the beam spots of the sub beams 622 and 623 span a plurality of tracks.

Increasing the beam spot diameter of the sub beams 622 and 623 enables a reduction in the high signal component (hereinafter, referred to as a "track cross component") in the spatial frequency that occurs when the sub beams 622 and 623 are reflected at boundaries between a track groove and a land, and thus enables offset signals to be detected regardless of the distance between the main beam and the sub beams. Therefore, this structure is able to adapt to various optical disc track pitches.

CONVENTIONAL EXAMPLE 3

Japanese Patent Application Publication No. 2001-325738 discloses a technique for detecting offset signals by increasing the size of the sub beam spots, with grooves formed in a diffractive optical element as curves in the planar view.

FIG. 8 shows the structure of a diffractive optical element 802 relating to the Conventional Example 3. As shown in FIG. 8, curved grooves are formed over the entire diffractive optical element 802. This construction enables the sub beam spots to be made large enough to span a plurality of tracks, and therefore achieves a similar effect as the Conventional Example 2.

However, in the Conventional Example 2, the intensity of the main beam 621 is weaker in the part that passes through the groove part 602a than in the part that passes through the flat part 602b of the diffractive optical element 602. This weakness is proportionate to the diffraction efficiency of the groove part 602a. When this effects the beam profile of the main beam 109, write errors and read errors occur.

Furthermore, the beam spots widen in the radial direction of the optical disc. For this reason, a difference occurs between the offset signals of the main beam 621 and the sub beams 622 and 623, and the offset signals cannot be cancelled appropriately, when the objective lens shifts in the radial direction.

In the Conventional Example 3, reducing the curvature radius of the grooves in the diffractive optical element 802 will result in the optical beams having differing intensity parts being used in the main beam and the sub beams. For this reason, offset signals corresponding to the objective lens shift amount will be generated differently with the main beam and the sub beams, and the offset signals will not be able to be cancelled entirely.

Conversely, if the curvature radius of the grooves in the diffractive optical element 802 is increased, the beam spots of the sub beams on the optical disc cannot be made sufficiently large, and, as a result, the track cross component cannot be suppressed entirely. Furthermore, the phase difference between the push pull signals of the main beam and the sub beams fluctuates in response to the amount the objective lens shifts, thereby causing detracking.

SUMMARY OF THE INVENTION

The present invention was conceived in view of the described problems, and has an object of providing an optical pickup that performs tracking accurately using a push pull method, regardless of the track pitch.

In order to solve the stated problem, the present invention is an optical pickup, including: a semiconductor laser; a diffractive optical element operable to diffract a beam emitted by the semiconductor laser; an objective lens operable to focus the diffracted beam on an optical disc; and a detection unit operable to receive the diffracted beam that has been reflected by the optical disc, to detect a tracking error signal, wherein the diffractive optical element has a plurality of first diffraction regions and second diffraction regions, the first and second diffraction regions are configured such that, when a zero order diffraction beam is being focused on a surface of the optical disc, the first diffraction regions diffract a first order diffraction beam such that the first order diffraction beam is focused at a position that is between the objective lens and the optical disc, and the second diffraction regions diffract the first order diffraction beam such that the first order diffraction beam is focused at a position that, with respect to the objective lens, is beyond the optical disc, and the first regions and the second regions are configured such that the first order diffraction beam has a beam width that, on the optical disc in a radial direction thereof, is two times or greater a track pitch of the optical disc.

By dividing the diffractive optical element into a plurality of first diffraction regions and second diffraction regions, deviations in the phase of sub push pull signals caused by the objective lens shifting with respect to the optical disc can be eliminated, and tracking error signals can be detected accurately.

Here, the first diffractive regions and the second diffractive regions may be divided from each other by boundary lines that are substantially orthogonal to a track of the optical disc, and each of the first diffractive regions and the second diffractive regions may have formed therein a set of grooves, the grooves in each set having a substantially concentric arc shape. Furthermore, the first diffractive regions and the second diffractive regions may be disposed so as to alternate with each other, and each set of grooves may be formed such that a concentric center thereof is outside the diffractive region in which the set of grooves is formed, and such that, with respect to the boundary lines, the sets of grooves in the first diffractive regions are substantially mirror images of the sets of grooves in the second diffractive regions.

Furthermore, the diffractive optical element may be structured such that, at a position at which a portion of the emitted beam that contributes to the zero order diffraction beam passes through, neither first nor second diffraction regions exist.

According to the stated structure, in the diffractive optical element, at a position at which a portion of the emitted beam that contributes to the zero order diffraction beam passes through, neither first nor second diffraction regions exist, and therefore the intensity of the main beam is not attenuated. This prevents read and write errors caused by attenuation of the main beam.

Furthermore, the semiconductor laser may emit a plurality of beams that are respectively different in wavelength, and with respect to the radial direction of the optical disc, a concentric center of concentric arc-shaped grooves provided in the first and second diffraction areas on a main surface of the diffractive optical element may lie between main beams of the plurality of beams.

According to this structure, the tracking error signal can be accurately detected with respect to various optical discs that use lasers with different wavelengths.

In this way, according to the present invention, since the tracking error signal can be detected accurately, accuracy of tracking can be improved. Furthermore, since the usage efficiency of the optical beam can be increased, recording and playback can be performed stably. In addition, whereas in the conventional examples it is necessary to rotationally adjust the diffractive optical element with high precision when assembling the optical pickup, the present invention eliminates the need for such rotational adjustment. Therefore, assembly time and manufacturing costs can be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIGS. 5A to 5C are graphs showing the relationship between push pull signals MPP, SPP1 and SPP2 and a displacement amount of the objective lens in a radial direction of the optical disc;

FIG. 8 shows the structure of a diffractive optical element of a conventional example 3;

DESCRIPTION OF PREFERRED EMBODIMENTS

The following describes embodiments of an optical pickup of the present invention with reference to the drawings.

1. First Embodiment (1) Optical Pickup Structure

The following describes the structure of an optical pickup of an embodiment of the present invention.

Figure 1:
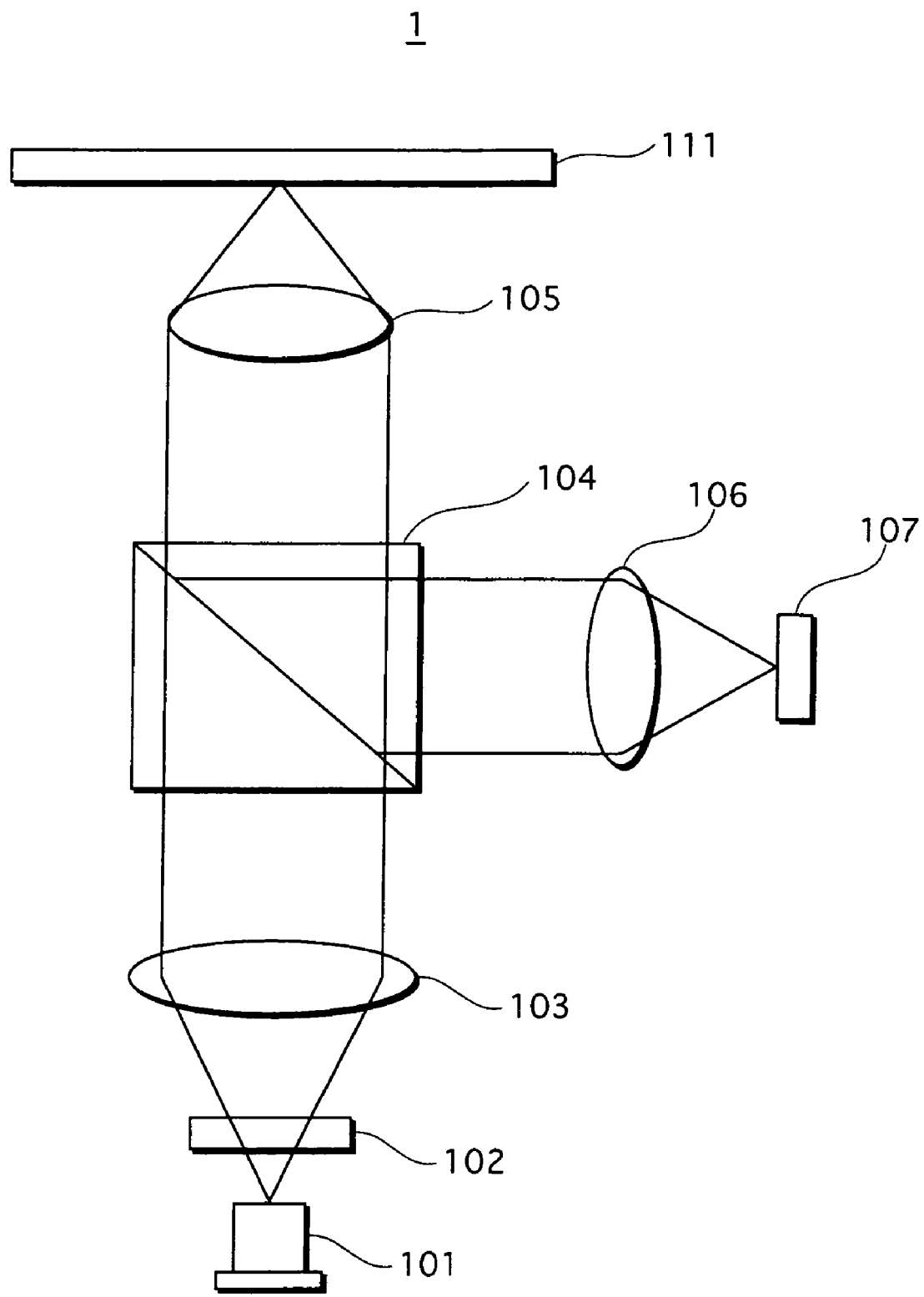
FIG. 1 shows the principal structure of an optical pickup relating to a conventional example 1.
Figure 2:
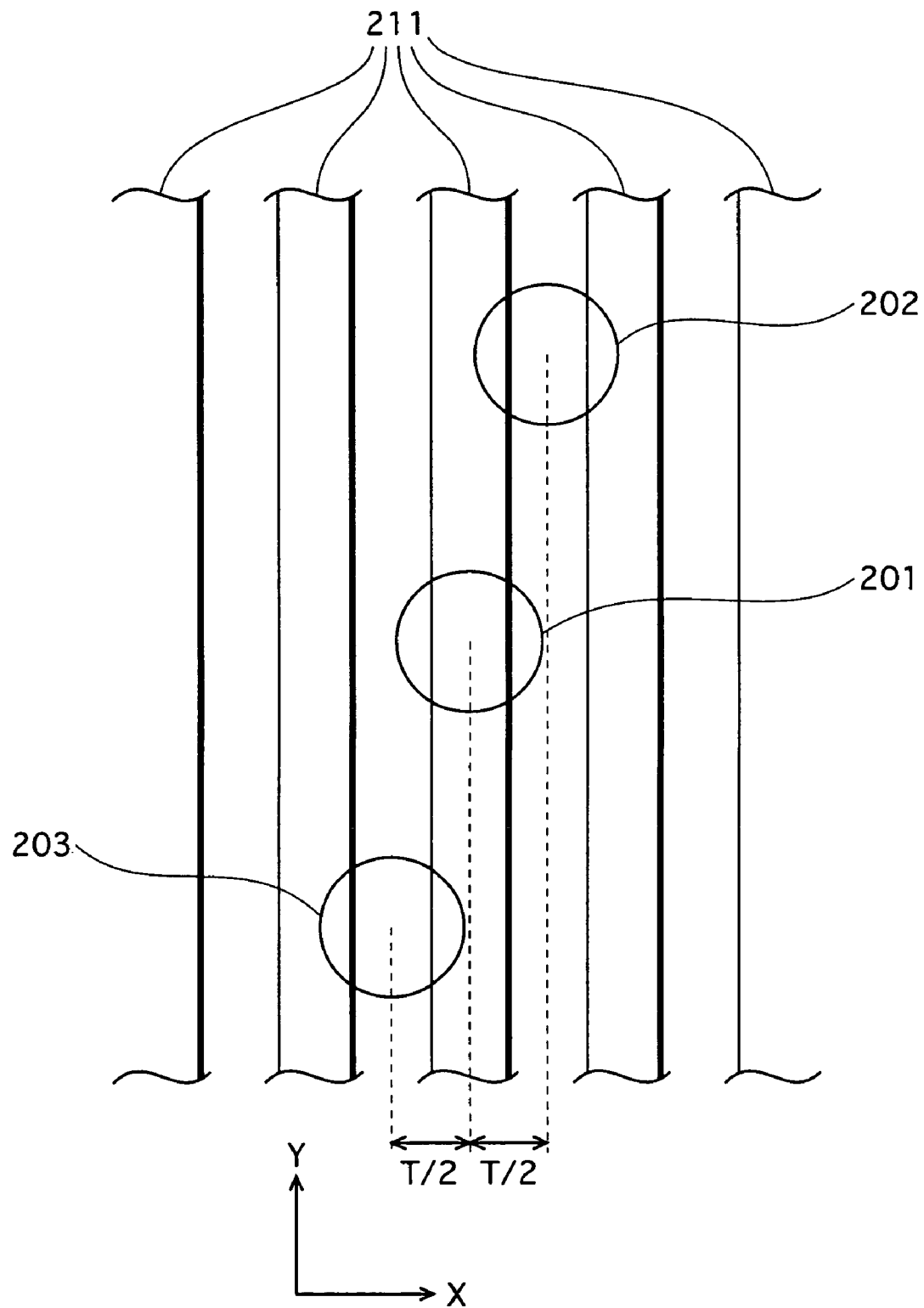
FIG. 2 shows beam spots that the optical pickup of the conventional example 1 forms on an optical disc.
Figure 3:
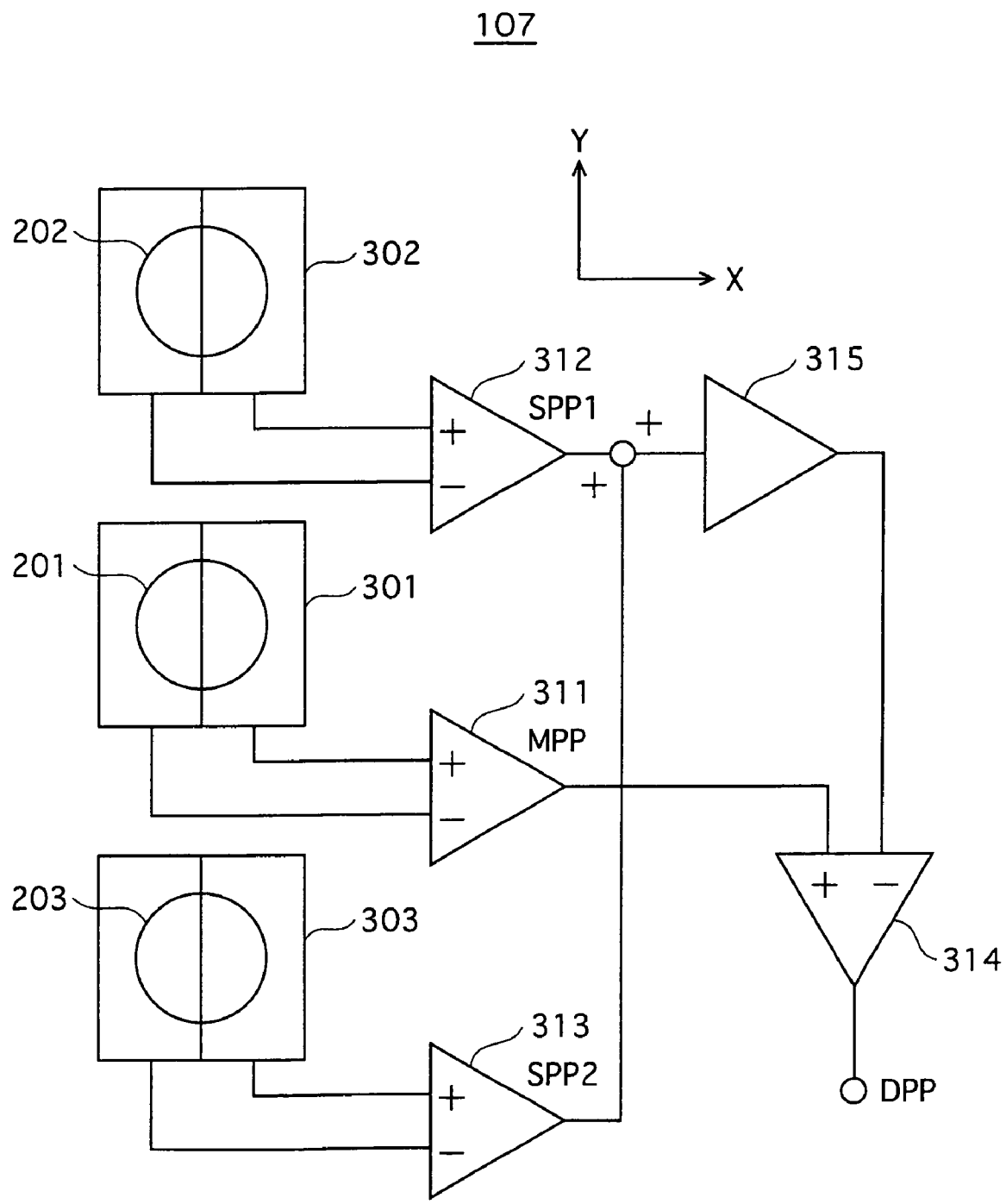
FIG. 3 shows the structure of an optical detector of the optical pickup of the conventional example 1.
Figure 4:
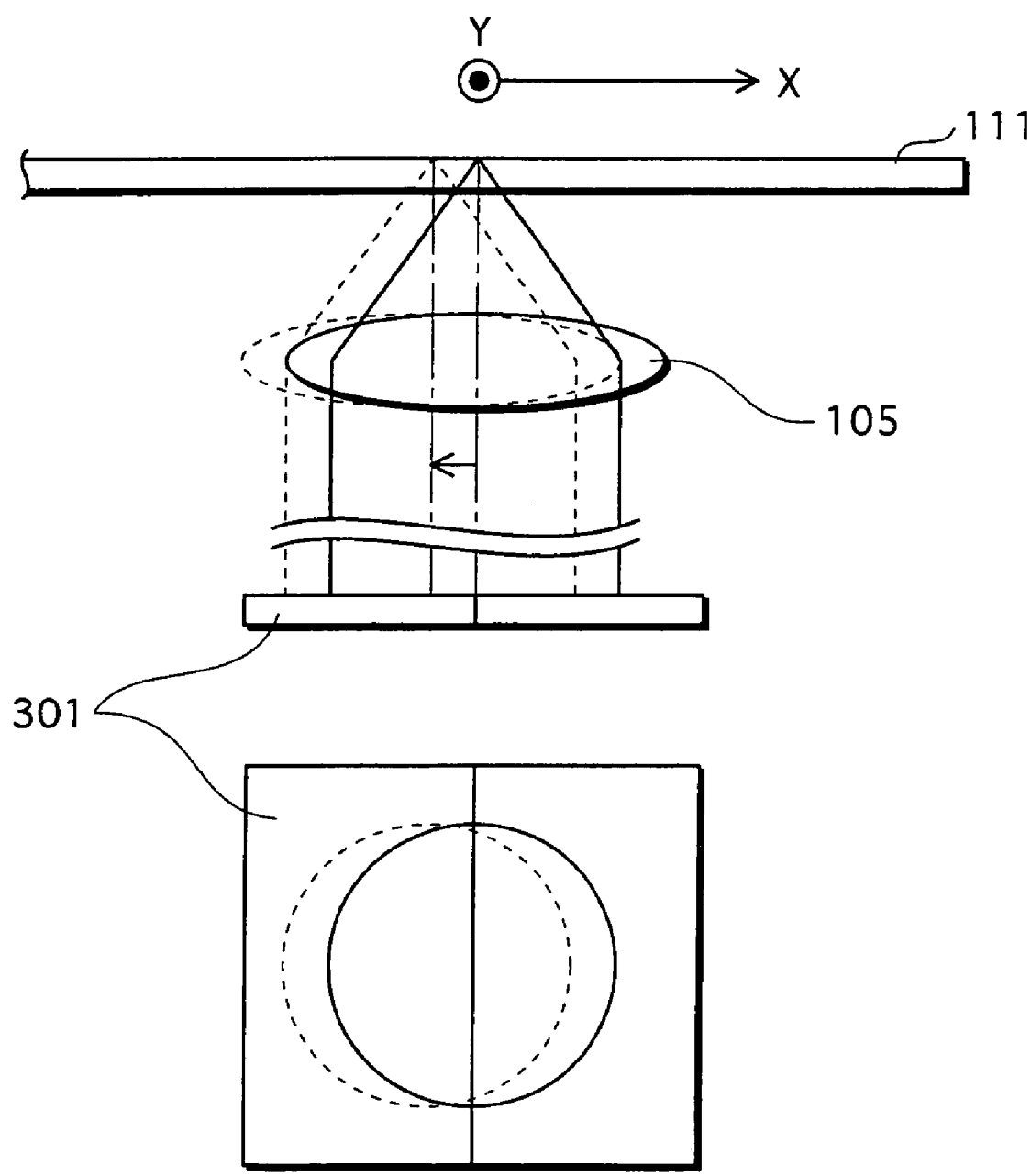
FIG. 4 shows the relationship between the position of an objective lens of the optical pickup of the conventional example 1 and a far field pattern received by a split optical detector.
Figure 6A:
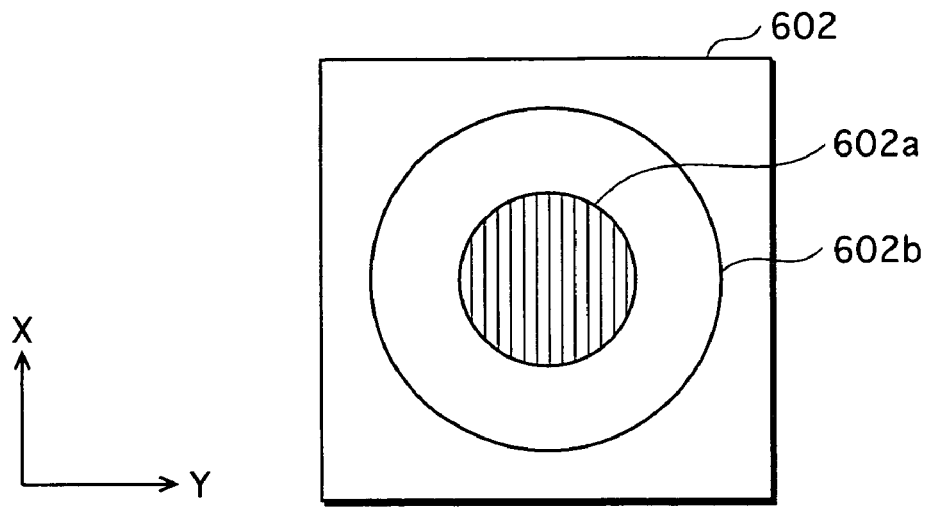
FIGS. 6A and 6B show a diffractive optical element of a conventional example 2, FIG. 6A being a planar view of the diffractive optical element, and FIG. 6B being a cross-sectional view of a light path from the diffractive optical element to an optical disc.
Figure 6B:
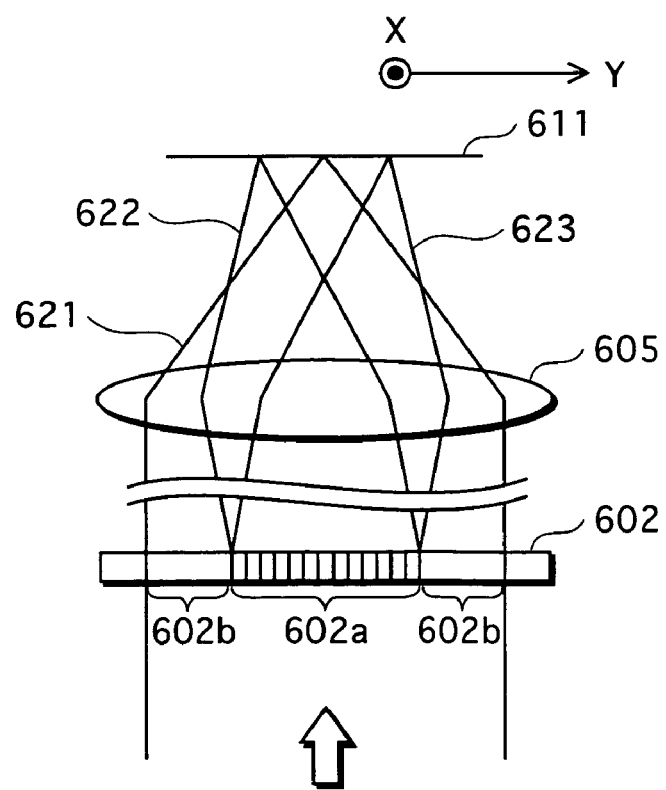
Figure 7:
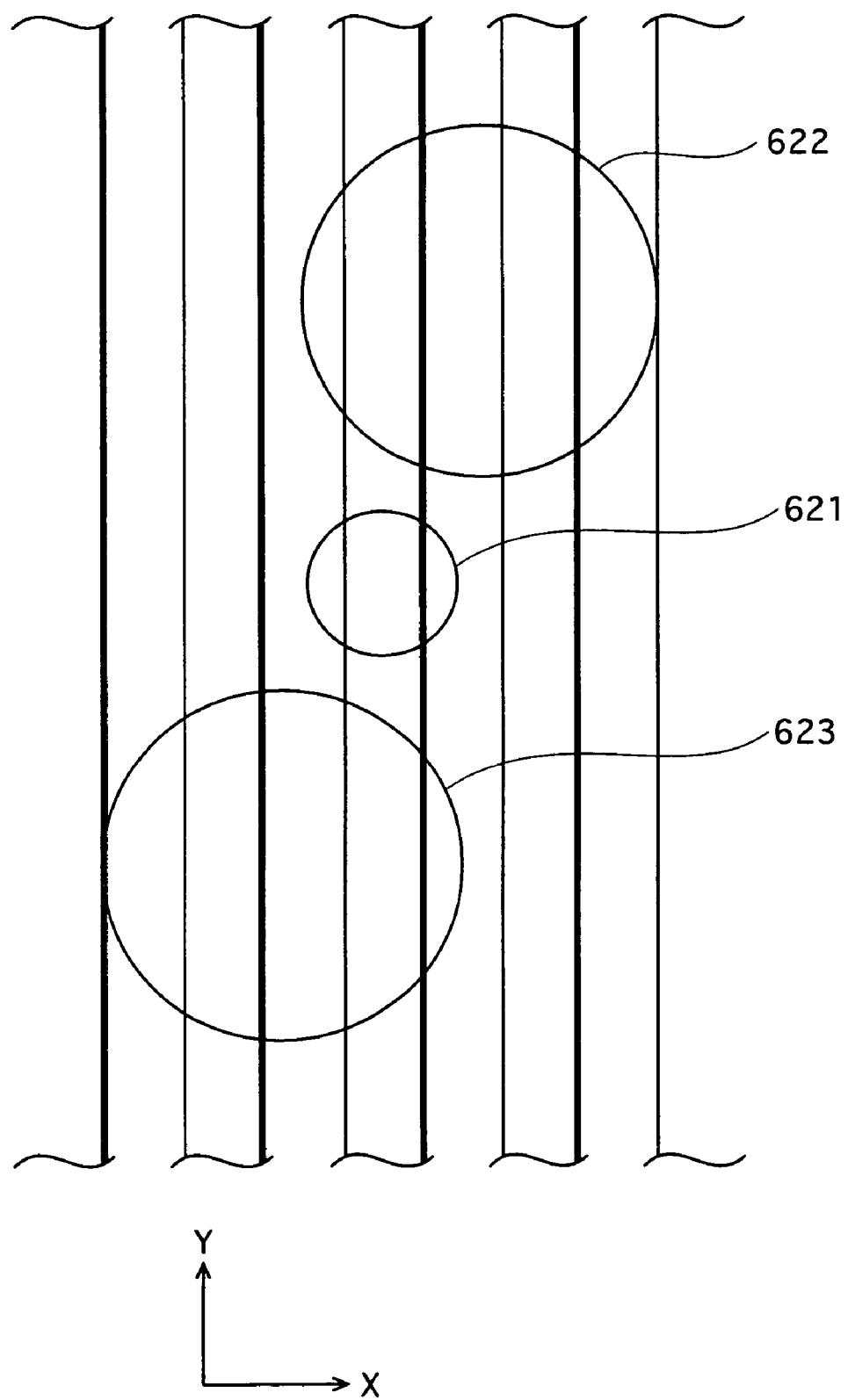
FIG. 7 shows beam spots that a main beam and sub beams of an optical pickup of the conventional example 2 form on the optical disc.
Figure 9:
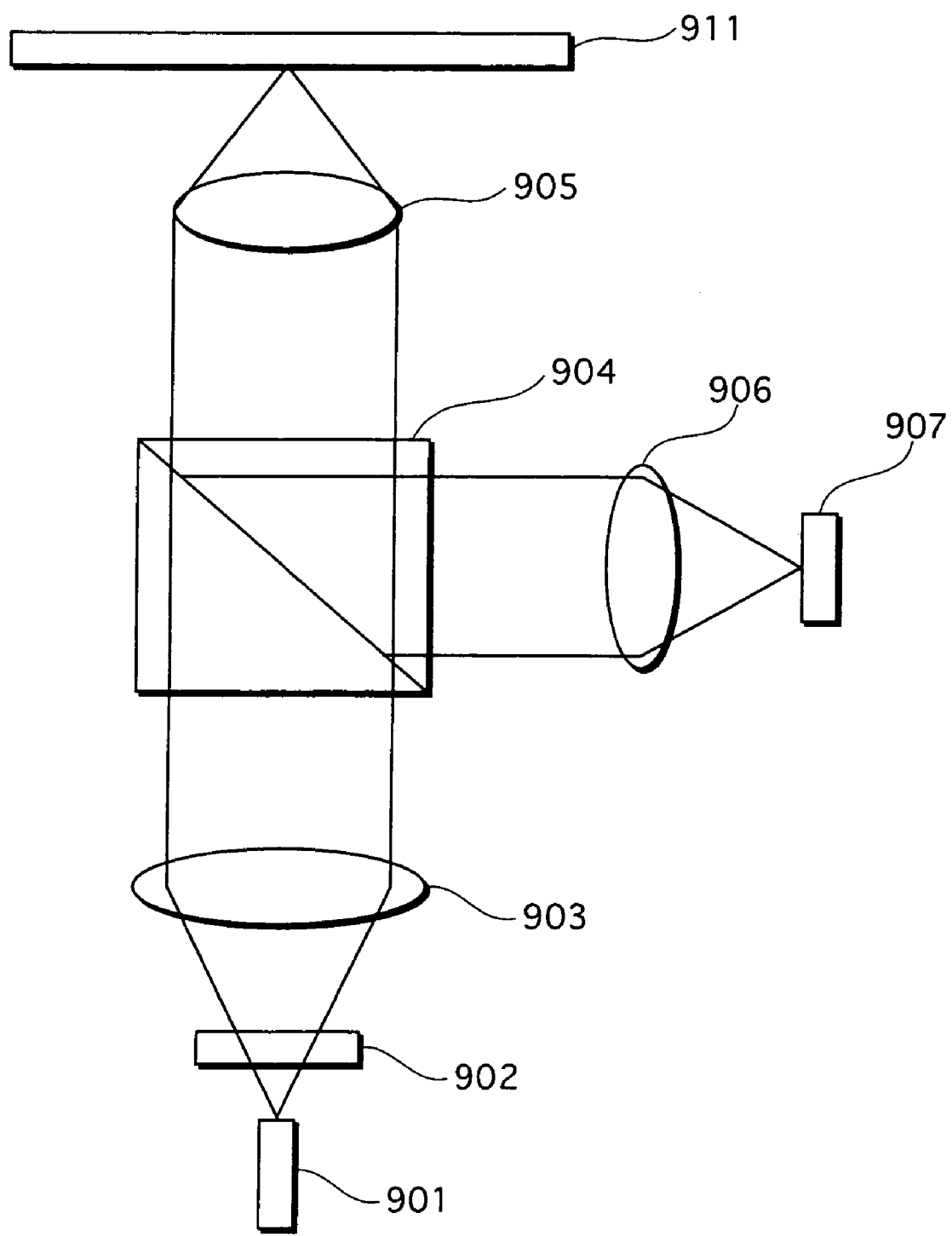
FIG. 9 shows the structure of an optical pickup of a first embodiment of the present invention.

FIG. 9 shows the structure of an optical pickup 9 of an embodiment of the present invention. As shown in FIG. 9, the optical pickup 9 is composed of a semiconductor laser 901, a diffractive optical element 902, a collimator lens 903, a beam splitter 904, an objective lens 905, a collective lens 906, and a optical detector 907. The optical pickup has a function of reading information from an optical disc 911.

The semiconductor laser 901 emits a laser beam.

The diffractive optical element 902 is a transmission grating, and splits the laser beam irradiated by the semiconductor laser 901, into a zero order diffraction beam (main beam) and plus and minus first order diffraction beams (sub beams).

The collimator lens 903 collimates the main beam and the sub beams into parallel beams. The parallel main beam and sub beams pass though the beam splitter 904, to be irradiated on the objective lens 905.

The objective lens 905 focuses the main beam and the sub beams on a recording surface of the optical disc 911, and also makes the main beam and sub beams reflected by the recording surface of the optical disc 911 substantially parallel.

The beam splitter 904 conducts the main beam and the sub beams reflected from the recording surface of the optical disc 911 to the collective lens 906.

The collective lens 906 focuses the main beam and the sub beams on the light detector 907.

The light detector 907 receives the main beam and the sub beams, and generates a tracking error signal.

(2) Structure of the Optical Detector 907

The following describes the structure of the optical detector 907.

Figure 10:
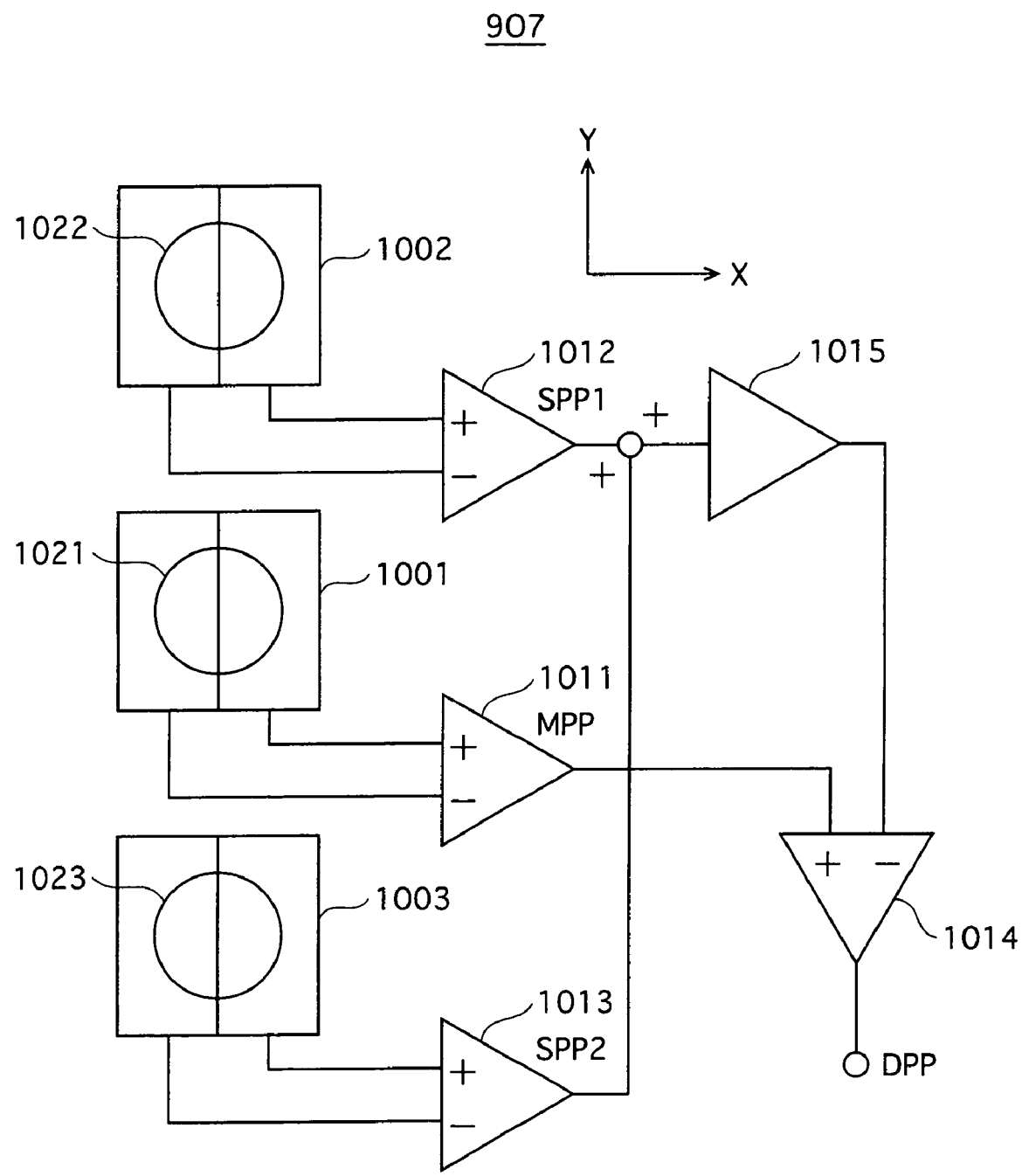
FIG. 10 shows the principal structure of an optical detector of the optical pickup of the first embodiment of the present invention.

FIG. 10 shows the principal structure of the optical detector 907. As shown in FIG. 10, the optical detector 907 is composed of split optical detectors 1001 to 1003, differential amplifiers 1011 to 1014, and an amplifier 1015. The far field pattern 1021 of the main beam is received by the split optical detector 1001, and the far field patterns 1022 and 1023 of the sub beams are received by the split optical detectors 1002 and 1003, respectively.

Each of the split optical detectors 1001 to 1003 is divided into two parts so as to be able to receive the respective far field patterns of beam spots (the field patterns on the optical disc 911) divided into two by a dividing line that is parallel to the track direction of the optical disc 911. The optical detectors 1001 to 1003 output push pull signals MPP, SPP1 and SPP2, respectively, as difference signals of the received far field patterns.

Hereinafter, with respect to the beam spots, a direction parallel with the track direction on the optical disc 911 is simply referred to as the "track direction", and a direction parallel with the radial direction of the optical disc 911 is simply referred to as the "radial direction".

(3) Shape of the Diffractive Optical Element 902

The following describes the shape of the diffractive optical element 902.

Figure 11:
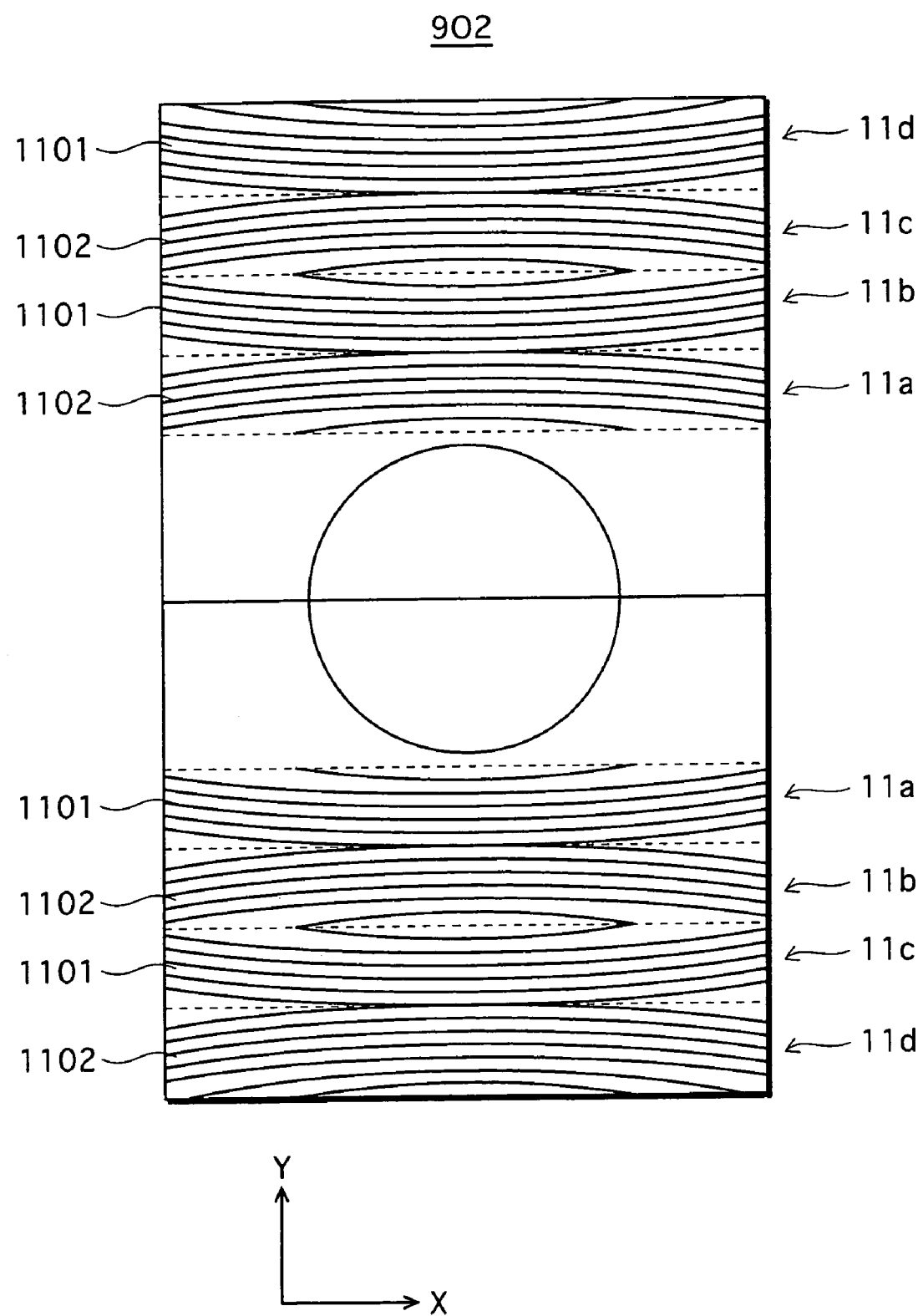
FIG. 11 is a planar view showing the shape of a diffractive optical element of the optical pickup of the first embodiment of the present invention.

FIG. 11 is a planar view showing the shape of the diffractive optical element 902. As shown in FIG. 11, the diffractive optical element 902 is divided into a plurality of regions, the boundaries of which are parallel lines that extend in the radial direction (X direction) of the optical disc 911. Specifically, the diffractive optical element 902 has regions 11a, regions 11b, regions 11c and regions 11d in the stated order, with the regions 11a being closest to the main beam.

Furthermore, each of the stated regions is one of two types of regions, specifically regions 1101 and regions 1102, depending of the form of the grooves provided on the surface. In both the regions 1101 and 1102, when seen in planar view, the grooves are arc-shaped and have substantially equal intervals therebetween. However, the grooves are oriented such that the grooves in the regions 1101 curve in a substantially opposite direction to the grooves in the regions 1102. In other words, the relationship between the grooves in the two types of regions is such that the respective curvature signs are opposite.

With the grooves provided in this way, the regions 1101 and 1102 generate sub beams. When the main beam is collimated on the optical disc to a diffraction limit that is determined according to the wavelength of the main beam and the aperture diameter of the objective lens 905, the sub beam generated by the region 1101 is focused at a position between the objective lens 905 and the optical disc 911, whereas the sub beam generated by the regions 1102 is not focused at a position between the objective lens 905 and the optical disc 911. Accordingly, both of the sub beams with expanded diameters in the radial direction are formed on the optical disc 911.

The surface area of the regions 1101 and 1102 are substantially the same as each other on each side of the position that the main beam passes through on the diffractive optical element 902. Furthermore, the total surface area of the regions 1101 and 1102 on one side of the position that the main beam passes through on the diffractive optical element 902 is substantially equal to that on the other side.

(4) Shape of the Beam Spots

The following describes the shapes of the beam spots that the optical pickup 9 forms on the optical disc 911.

Figure 12:
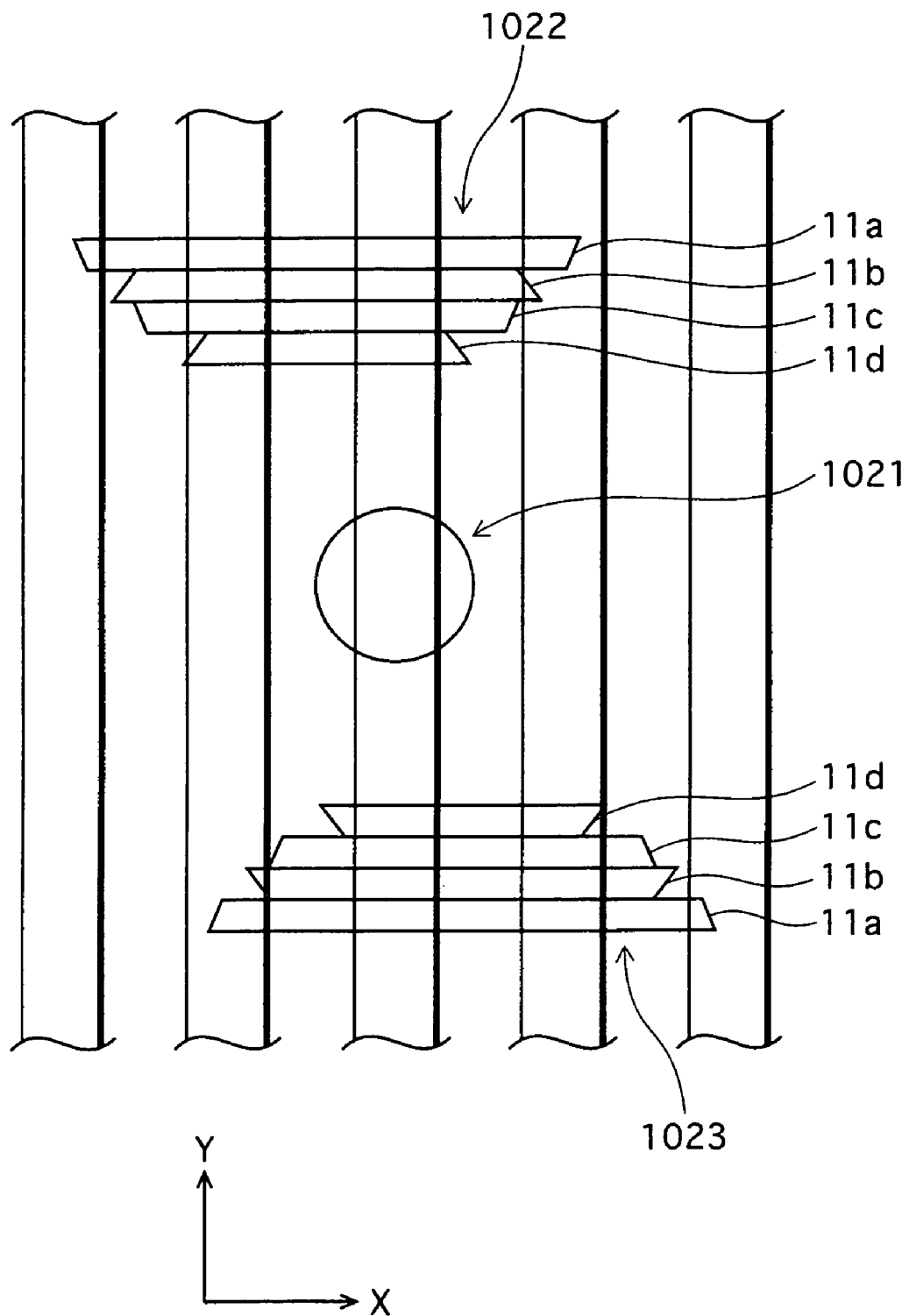
FIG. 12 is a planar view showing beam spots that the optical pickup of the first embodiment of the present invention forms on an optical disc.

FIG. 12 is a planar view showing beam spots that the optical pickup 9 forms on the optical disc 911. As shown FIG. 12, with respect to the beam spot of the main beam 1021, the respective beam spots of the sub beams 1022 and 1023 are displaced in the radial direction by half the track width. Each of the sub beams is composed of four portions that correspond respectively to the four regions 11a to 11d of the diffractive optical element 902.

The beam spots of the sub beams 1022 and 1023 are expanded in the radial direction of the optical disc 911. Specifically, the beam diameter of the sub beams spots in the radial direction of the optical disc 911 is approximately three times the track pitch. This is to suppress generation of a track cross component. Note that the sub beams 1022 and 1023 have substantially equal light intensities.

(5) Properties of the Optical Pickup 9

The following describes properties of the optical pickup 9.

In the diffractive optical element 902, the grooves in the regions 1101 curve in substantially the opposite direction to the grooves in the regions 1102. Furthermore, the regions 1101 and 1102 receive substantially the same amount of light, and are disposed alternately in the track direction (Y-direction) of the optical disc 911. In other words, the regions 1101 and 1102 are divided by boundaries that are parallel lines extending in the radial direction (X direction) of the optical disc 911.

For this reason, if the objective lens 905 shifts in the radial direction of the optical disc 911, each of the beam spots formed on the optical disc 911 shift toward either the inner circumference or the outer circumference of the optical disc 911, depending of which of the regions 1101 or the regions 1102 diffracts the sub beams 1022 and 1023.

Figure 13:
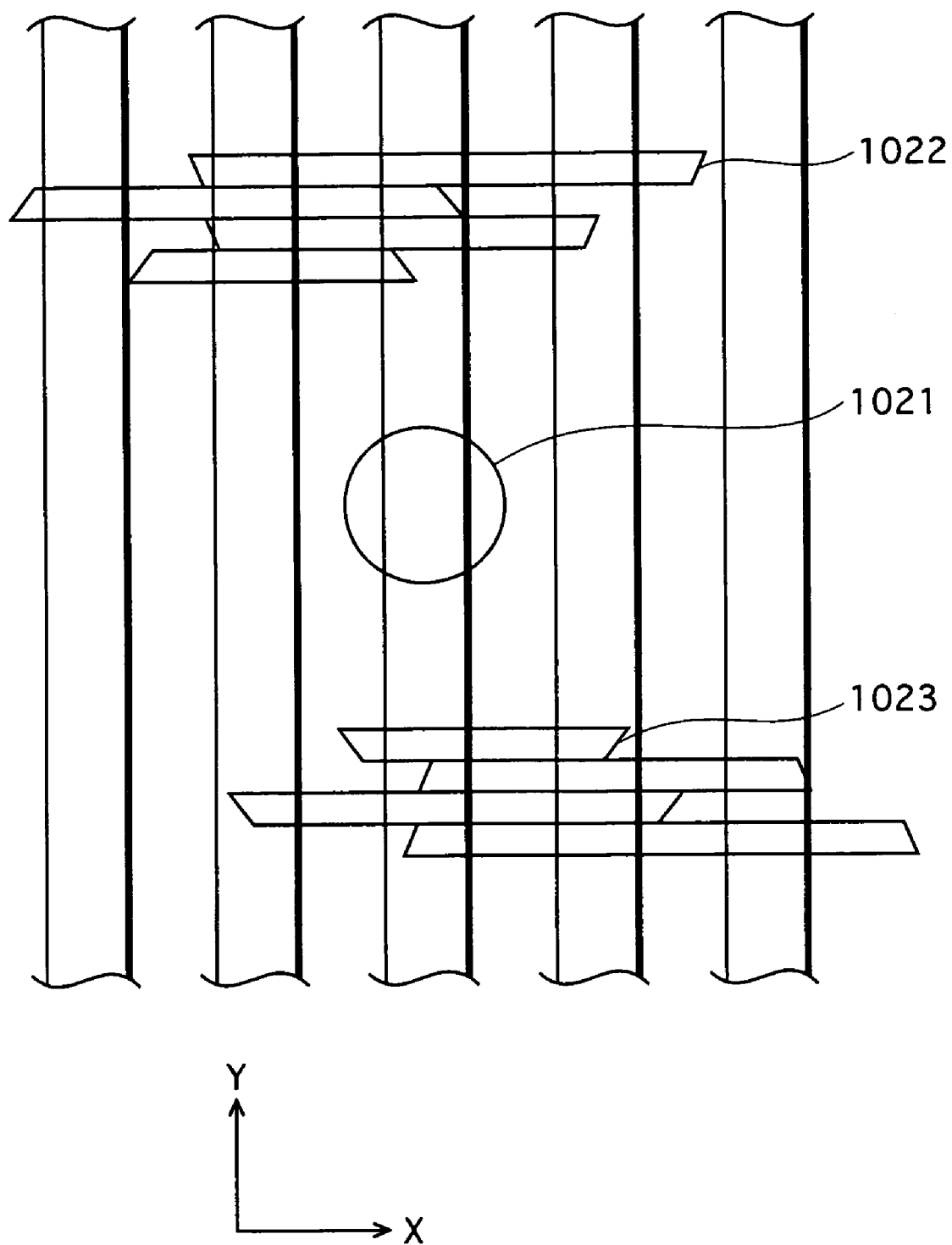
FIG. 13 shows beam spots formed when an objective lens of the optical pickup of the first embodiment of the present invention shifts in a radial direction of the optical disc.

FIG. 13 shows beam spots formed when the objective lens 906 shifts in the radial direction of the optical disc 911. Compared to the beams spots shown in FIG. 12, each portion of the beam spots of the sub beams 1022 and 1023 shown in FIG. 13 is displaced toward either the inner circumference or the outer circumference of the optical disc 911.

As a result, the phase difference between the main push pull signal MPP and the sub push pull signal SPP1, and the phase difference between the main push pull signal MPP and the sub push pull signal SPP2 are equal. If this phase difference is cancelled out between the sub push pull signals SPP1 and SPP2, the phase of offset signal of the main push pull signal and the offset signals of the sub push pull signals will be the same.

In other words, the objective lens 905 shifting in the radial direction of the optical disc 911 is equivalent to the diffractive optical element 902 shifting in the radial direction of the optical disc 911, and the positional relationship of the beam spot of main beam 1021 to the beam spots of the sub beams 1022 and 1023 changes.

When the distance between the respective centers of the beam spots in the radial direction of the optical disc 911 deviates from being one half of a track, the phase difference of the main push pull signal MPP with the sub push pull signals SPP1 and SPP2 deviates from 180 degrees. Since the amplitude of the push pull signals SPP1 and SPP2 is not small enough to be able to be ignored, and there is a danger that the accuracy of the tracking error signal will be reduced due to the deviation in the phase difference.

However, in the present embodiment, since the phase differences between the main push pull signal MPP and the sub push pull signals SPP1 and SPP2 cancel each other out as described, the accuracy of the tracking error signal is maintained.

Figure 14A:
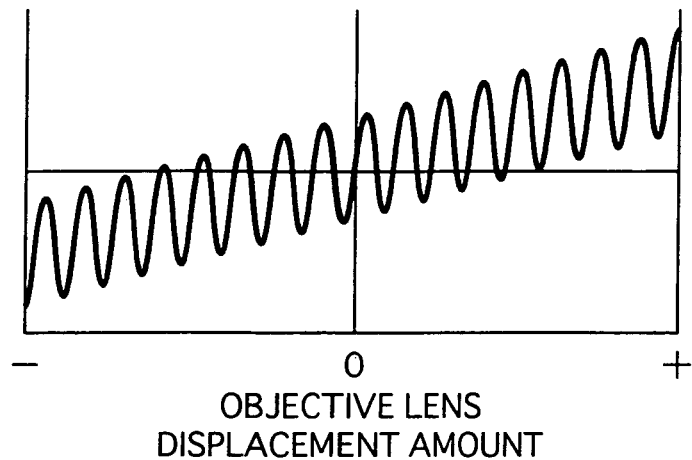
FIGS. 14A to 14C shows the relationship between push pull signals and displacement amount of the objective lens of the optical pickup of the first embodiment of the present invention, FIG. 14A being a graph relating to a main push pull signal, FIG. 14B being a graph relating to sub push pull signals, and FIG. 14C being a push pull signal obtained ultimately.
Figure 14B:
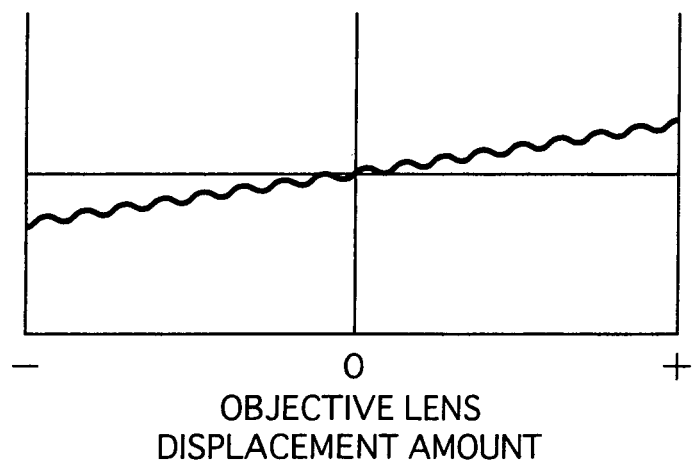
Figure 14C:
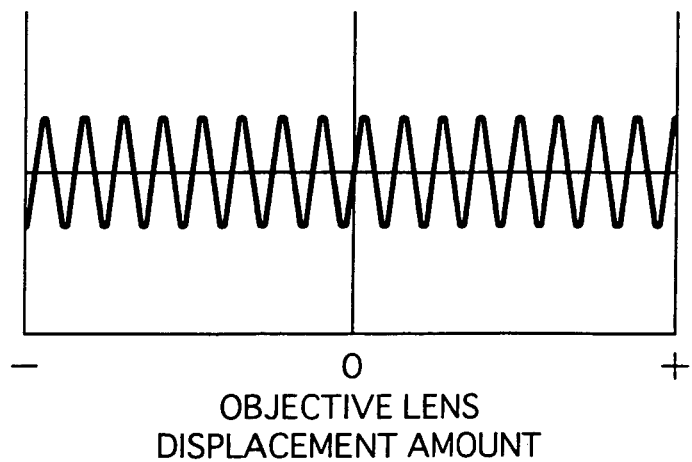

FIGS. 14A to 14C show the relationship between the amount of displacement of the objective lens and the push pull signals. Specifically, FIG. 14A is a graph pertaining to the main push pull signal, FIG. 14B is a graph pertaining to the sub push pull signals, and FIG. 14C is a graph pertaining to the push pull signal that is ultimately obtained.

As shown in the figures, in a sub push pull signal obtained by adding the sub push pull signals SPP1 and SPP2, the phase difference between the sub push pull signals SPP1 and SPP2 is cancelled, resulting in this sub push pull signal having the same phase as the main push pull signal MPP (FIGS. 14A and 14B). Hence, the offset signal is accurately removed from the push pull signal obtained using Expression 1.

On the other hand, since the regions 1101 and 1102 are disposed alternately in the radial direction of the optical disc 911, and not divided in the track direction, the beams spots are not expanded in the radial direction of the optical disc as they would be due to the diffraction effect if the diffractive optical element 902 was divided into regions.

Therefore, the offset signals caused by the objective lens 905 shifting in the radial direction of the optical disc 911 or the optical disc 911 tilting have the same phase in the main beam and the sub beams, and are linear. This allows the offset signals to be cancelled more accurately than with a conventional technique.

This property is the same regardless of the distance between the sub beams 1022 and 1023 and the main beam 1021 in the radial direction of the optical disc 911. Therefore, according to the present embodiment, the tracking error can be accurately cancelled with respect to an optical disc, regardless of the tracking pitch of the standard to which the optical disc complies.

2. Second Embodiment

The following describes a second embodiment of the present invention. The optical pickup of the present embodiment is basically the same as the optical pickup of the first embodiment in terms of structure, but differs in that it has a plurality of laser light sources. The following description focuses on aspects that differ from the first embodiment.

Figure 15:
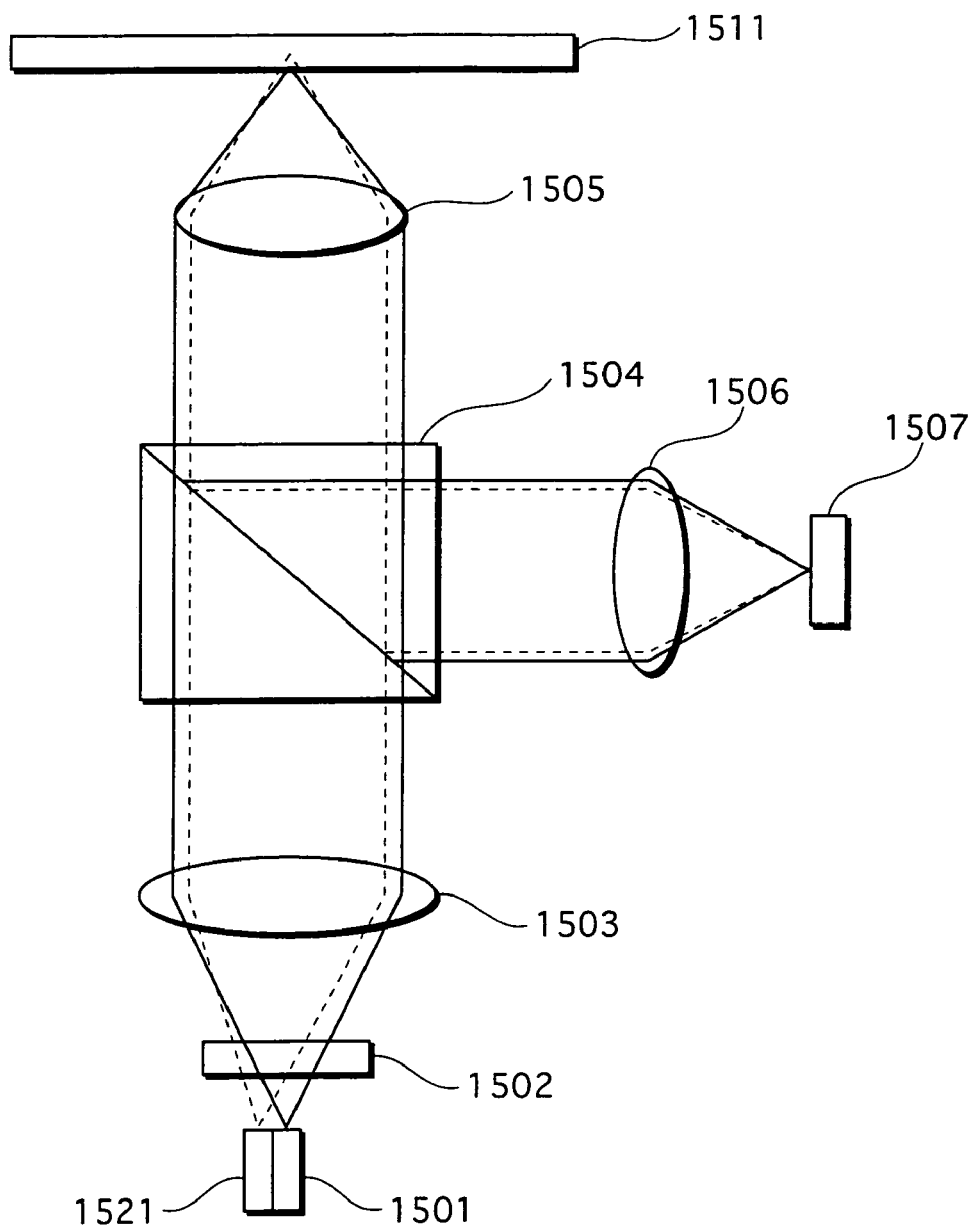
FIG. 15 shows the principal structure of an optical pickup of a second embodiment of the present invention.

FIG. 15 shows the principal structure of an optical pickup 15 of the present embodiment. As shown in FIG. 15, the optical pickup 15 is composed of semiconductor lasers 1501 and 1521, a diffractive optical element 1502, a collimator lens 1503, a beam splitter 1504, an objective lens 1505, a collective lens 1506, and an optical detector 1507. The optical pickup 15 has a function of reading information from an optical disc 1511.

Figure 16:
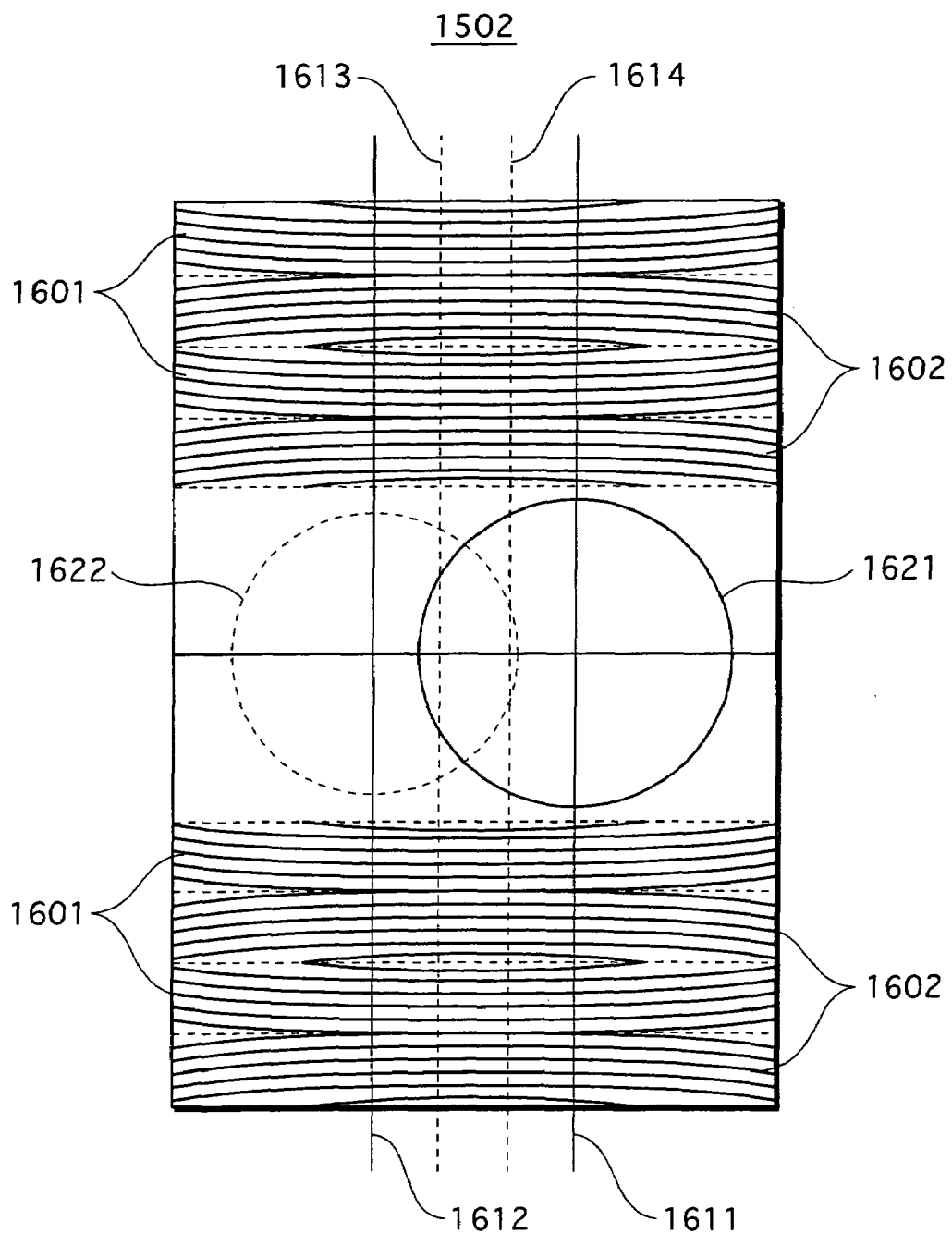
FIG. 16 is a planar view showing the structure of a diffractive optical element of the optical pickup of the second embodiment of the present invention.

FIG. 16 is a planar view showing the structure of the diffractive optical element 1502. As shown in FIG. 16, regions 1601 and 1602 are disposed alternately in the track direction of the optical disc 1511 on a main surface of the diffractive optical element 1502. Formed in each of the regions is arc-shaped concentric grooves, the grooves in the regions 1601 curving in an opposite direction to the grooves in the regions 1602.

The light irradiated from the semiconductor lasers 1501 and 1521 passes through circular regions 1621 and 1622. Solid lines 1611 and 1612 show center positions of the circular regions 1621 and 1622, respectively, in the radial direction of the optical disc 1511. These center positions are the positions where the principal rays of the light emitted from the semiconductor lasers 1501 and 1521 pass through.

A broken line 1613 shows, in the radial direction of the optical disc 1511, the center position of the arc-shaped grooves formed in the region 1601. Furthermore, a broken line 1614 shows, in the radial direction of the optical disc 1511, the center position of the arc-shaped grooves formed in the regions 1602.

In the present embodiment, the grooves are formed such that the broken lines 1613 and 1614 lie between the solid lines 1611 and 1612. This enables the amplitude of the sub push pull signals to be suppressed, as well as enabling fluctuations in the phase difference between the main push pull signal and the sub push pull signals to be suppressed. Therefore, tracking errors can be accurately resolved with respect to both of the semiconductor lasers 1501 and 1502.

3. Modification Examples

Although the present invention has been described based on preferred embodiments, the present invention is not limited to the described embodiments. The following are examples of possible modifications.

(1) Although the grooves in the regions 1101 and 1102 are formed with substantially equal intervals therebetween in the track direction of the optical disc 911 in the described embodiments, the present invention is not limited to this structure. As an alternative, a Fresnel pattern may be used. Specifically, the intervals between the grooves in each of the regions 1101 may become larger as the grooves become further away from the center of the main beam in the track direction of the optical disc 911, and the intervals between the grooves in each of the regions 1102 may become smaller as the grooves become further away from the center of the main beam in the track direction of the optical disc 911.

(2) Although in the described embodiments grooves are formed in the regions 1101 and 1102 provided in part of the diffractive optical element 902, the present invention is not limited to this structure. The following alternative structure may be used.

Figure 17:
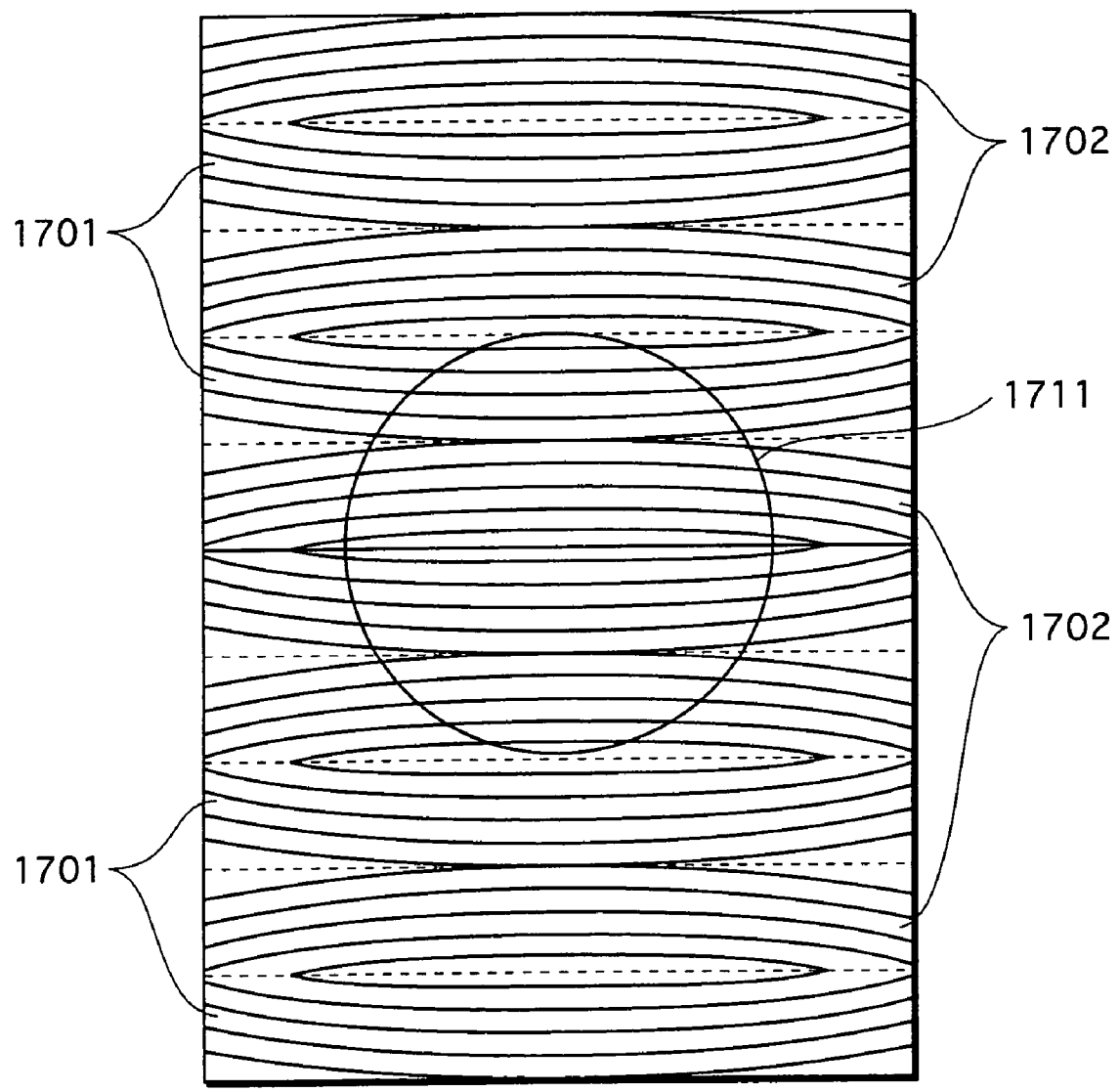
FIG. 17 is a planar view showing the structure of a diffractive optical element of a modification example (2) of the present invention.

FIG. 17 is a planar view showing the structure of a diffractive optical element 17 of the present modification example. In FIG. 17, a circular region 1711 is a region through which the main beam passes. As shown in FIG. 17, the diffractive optical element 17 is divided such that regions 1701 and regions 1702 appear alternately in the track direction of the optical disc.

The regions 1701 and 1702 also exist in the circular region 1711. Furthermore, the grooves are formed having different curves, such that those in the regions 1701 have a different curvature sign to those in the regions 1702.

With this structure, the amount of light lost from the main beam can be suppressed, thus improving the light use efficiency.

(3) Although not mentioned in the described embodiments, the size of the sub beam spots should be two times the track pitch in the radial direction of the optical disc, or greater.

In particular, to make the amplitude of the sub push pull signals sufficiently small, it is preferable that the size of the sub beam spots be three times the track pitch, or greater. However, since relatively large sub beam spots will be even larger on the optical detector surface and thus necessitate a larger optical detector, it is preferable that the size of the sub beam spots is no greater than six times the track pitch.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An optical pickup, comprising:
   a semiconductor laser;
   a diffractive optical element operable to diffract a beam emitted by the semiconductor laser;
   an objective lens operable to focus the diffracted beam on an optical disc; and
   a detection unit operable to receive the diffracted beam that has been reflected by the optical disc, to detect a tracking error signal,
   wherein the diffractive optical element has a plurality of first diffraction regions and second diffraction regions,
   the first and second diffraction regions are configured such that, when a zero order diffraction beam is being focused on a surface of the optical disc, the first diffraction regions diffract a first order diffraction beam such that the first order diffraction beam is focused at a position that is between the objective lens and the optical disc, and the second diffraction regions diffract the first order diffraction beam such that the first order diffraction beam is focused at a position that, with respect to the objective lens, is beyond the optical disc, and the first regions and the second regions are configured such that the first order diffraction beam has a beam width that, on the optical disc in a radial direction thereof, is two times or greater a track pitch of the optical disc.

2. The optical pickup of claim 1, wherein the first diffractive regions and the second diffractive regions are divided from each other by boundary lines that are substantially orthogonal to a track of the optical disc, and each of the first diffractive regions and the second diffractive regions has formed therein a set of grooves, the grooves in each set having a substantially concentric arc shape.

3. The optical pickup of claim 2, wherein the first diffractive regions and the second diffractive regions are disposed so as to alternate with each other, and each set of grooves is formed such that a concentric center thereof is outside the diffractive region in which the set of grooves is formed, and such that, with respect to the boundary lines, the sets of grooves in the first diffractive regions are substantially mirror images of the sets of grooves in the second diffractive regions.

4. The optical pickup of claim 1, wherein in the diffractive optical element, at a position at which a portion of the emitted beam that contributes to the zero order diffraction beam passes through, neither first nor second diffraction regions exist.

5. The optical pickup of claim 1, wherein the semiconductor laser emits a plurality of beams that are respectively different in wavelength, and with respect to the radial direction of the optical disc, a concentric center of concentric arc-shaped grooves provided in the first and second diffraction areas on a main surface of the diffractive optical element lies between main beams of the plurality of beams.

* * * * *